United States Patent [19]
Herold

[11] Patent Number: 6,057,411
[45] Date of Patent: May 2, 2000

[54] PROCESS FOR FORMING POLY(ALLYL CARBONATE)-FUNCTIONAL PREPOLYMER COMPOSITION

[75] Inventor: Robert D. Herold, Monroeville, Pa.

[73] Assignee: PPG Industries Ohio, Inc., Cleveland, Ohio

[21] Appl. No.: 09/000,660

[22] Filed: Dec. 30, 1997

[51] Int. Cl.[7] ................. C08F 18/24; C08F 4/34
[52] U.S. Cl. ............. 526/314; 526/227; 526/230.5; 526/320
[58] Field of Search .................. 526/230.5, 320, 526/314

[56] References Cited

U.S. PATENT DOCUMENTS

| | | | |
|---|---|---|---|
| 4,590,248 | 5/1986 | Moriya et al. | 526/228 |
| 4,613,656 | 9/1986 | Tang | 526/193 |
| 4,623,708 | 11/1986 | Ezrielev | 526/314 |
| 4,686,266 | 8/1987 | Tang | 526/193 |
| 4,742,133 | 5/1988 | Tang et al. | 526/235 |
| 4,829,136 | 5/1989 | Oates | 526/230.5 |
| 4,959,429 | 9/1990 | Misura et al. | 526/230.5 |
| 4,959,433 | 9/1990 | Oates et al. | 526/314 |
| 5,017,666 | 5/1991 | Crano et al. | 526/230.5 |

FOREIGN PATENT DOCUMENTS

| | | |
|---|---|---|
| 1541889 | 9/1968 | France . |
| 62 448 | 5/1965 | Germany . |
| 51-9188 | 1/1976 | Japan . |
| 57-26521 | 6/1982 | Japan . |
| 57-133106 | 8/1982 | Japan . |
| 61-51012 | 3/1986 | Japan . |
| 61-64706 | 4/1986 | Japan . |
| 61-296009 | 12/1986 | Japan . |
| 5-29664 | 2/1993 | Japan . |

OTHER PUBLICATIONS

"Peroxy Compounds", Reprinted from *Encyclopedia of Polymer Science and Engineering*, vol 11, 2d Ed., John Wiley & Sons, Inc., (1988), pp. 1–21.

"Organic Peroxides", Aztec Peroxides, Inc., (1994), both covers and pp. 1–21.

C. S. Sheppard and V. R. Kamath, "The Selection and Use of Free Radical Initiators", Reprinted from *Polymer and Engineering Science*, (Jul., 1979), pp 597–606.

"Peroxide Selection Based on Half–Life", 2d Ed., Elf Atochem North America (1992), title page and pp 1–15.

"Polycarbonate Polymerization Initiators", PPG Industries, Inc., (1972), title page and pp 1–38.

M. Lasch et al, "Physikalische Messungen an einem Kunststoff als optischem Medium", JAPS, vol. II, pp. 369–381 (1967).

*Primary Examiner*—Tae Yoon
*Attorney, Agent, or Firm*—George D. Morris

[57] ABSTRACT

A process for forming a polymerizable, liquid, substantially gel-free, poly(allyl carbonate)-functional prepolymer composition comprises heating a neat composition comprising at least one poly(allyl carbonate)-functional monomer and free radical initiator having a ten-hour half-life temperature of at least 85° C. at temperatures in the range of from 5 Celsius degrees below the ten-hour half-life temperature of the free radical initiator to 150° C., to form a reaction mixture having an increased 25° C. viscosity in the range of from 25 to 10,000 centipoises and an ethylenic double bond utilization of at least 3 percent; and over a period of less than 90 minutes cooling the reaction mixture to a temperature at least 20 Celsius degrees below the ten-hour half-life temperature of the initiator.

17 Claims, No Drawings

PROCESS FOR FORMING POLY(ALLYL CARBONATE)-FUNCTIONAL PREPOLYMER COMPOSITION

BACKGROUND OF THE INVENTION

Poly(allyl carbonate)-functional monomer compositions are polymerized using free radical initiators to produce hard polymers. Many of these polymers are substantially transparent to visible light, are substantially colorless, have refractive indices of from about 1.45 to about 1.6, and possess Barcol hardnesses above about zero. For these reasons, such monomer compositions find utility as precursors for transparent coatings, optical lenses, optical lens blanks, and other optical elements, and flat or curved transparent sheets. Light transmission characteristics may be altered by incorporating dyes, light absorbing compounds, pigments, and the like, in the monomer composition before polymerization, or by dying the polymer.

One problem associated with the polymerization of poly(allyl carbonate)-functional monomer compositions is the relatively high shrinkage of the material which occurs during the course of polymerization to the final thermoset polymer. For example, there is a shrinkage of approximately 13 percent during the polymerization of diethylene glycol bis(allyl carbonate). Such high shrinkages are particularly detrimental in casting operations such as those used to produce ophthalmic lenses and ophthalmic lens blanks, where the liquid monomer composition is introduced to a mold and thereafter polymerized to the final thermoset polymer.

Although it is not desired to be bound by any theory, it is believed that the shrinkage is primarily the result of a reduction in volume accompanying the conversion of allylic groups to units of polymer.

It is known that shrinkage in the mold may be educed by introducing a liquid prepolymer to the mold and thereafter polymerizing the prepolymer to the final thermoset olymer. The prepolymer is usually produced by partially polymerizing the poly(allyl carbonate)-functional monomer composition to consume a portion of the allylic groups. The partial polymerization is stopped, however, before more than a trivial amount of gellation occurs so that the prepolymer may be introduced to the mold as a liquid.

Although the principle is sound, there have been difficulties in accomplishing acceptable results in practice.

One approach has been to conduct the prepolymerization in the presence of a substantially inert organic solvent, ensure termination of the reaction, and then remove the solvent by distillation. See, for example, the following patents: U.S. Pat. No. 4,613,656, U.S. Pat. No. 4,686,266, U.S. Pat. No. 4,959,429, U.S. Pat. No. 4,959,433, U.S. Pat. No. 5,017,666, and JP 61[1986]-64706. Removal of solvent is time consuming, expensive, and, in those cases where the solvent is toxic or flammable, hazardous. Removing the last amounts of solvent without introducing unsatisfactory color to the prepolymer is usually difficult.

Another approach has been to conduct the prepolymerization in a neat system, i.e., a system substantially free of inert solvent, using initiators having low ten-hour half-life temperatures. See, for example, the following patents: U.S. Pat. No. 4,590,248, U.S. Pat. No. 4,623,708, JP 51[1976]-9188, JP 57[1982]-26521, JP 57[1982]-133106, JP 61[1986]-51012, and JP 05[1993]-29664. With this approach, once the desired viscosity has been or is about to be achieved, the reaction mixture is cooled to stop the reaction. If the low ten-hour half-life temperature initiator has not been consumed, the storage stability of the prepolymer product is poor. In order to address the problem, attempts have been made to regulate the amount of initiator, the reaction temperature, and other variables so that when the reaction is cooled to stop the polymerization, the low ten-hour half-life temperature initiator will have been consumed and the prepolymer viscosity will be at the desired value. This mode of operation is not practical because the numbers of variables to be controlled are so large that attainment of desired prepolymer product viscosities on a reproducible basis is difficult.

A process has now been found which is relatively easy to control and which can be used to consistently produce prepolymer products having viscosities falling within reasonably narrow specification ranges. The prepolymer products are polymerizable, liquid, substantially gel-free, and substantially storage-stable at ordinary ambient temperatures.

Accordingly, the invention is a process for forming a polymerizable, liquid, substantially gel-free, poly(allyl carbonate)-functional prepolymer composition comprising: (a) heating a neat composition comprising at least one poly(allyl carbonate)-functional monomer and free radical initiator having a ten-hour half-life temperature of at least 85° C. at temperatures in the range of from 5 Celsius degrees below the ten-hour half-life temperature of the free radical initiator to 150° C., to form a reaction mixture having an increased 25° C. viscosity in the range of from 25 to 10,000 cps and an ethylenic double bond utilization of at least 3 percent; and (b) over a period of less than 90 minutes cooling the reaction mixture to a temperature at least 20 Celsius degrees below the ten-hour half-life temperature of the initiator.

Since the process is solventless, the hazards associated with handling solvents are eliminated, and a solvent-removing step is not required.

Since the initiator has a high ten-hour half-life temperature and is stable at ordinary ambient temperatures, the prepolymer product is stable at ordinary ambient temperatures notwithstanding the presence of initiator residues. Because it is not necessary to completely consume the initiator, the process is relatively robust in respect of variations in initiator concentration.

A product with a particular specification of 25° C. viscosity (such as from 110 to 120 cps) can be consistently produced by monitoring the viscosity of the reaction mixture during the partial polymerization process.

In the interests of brevity, initiators having ten-hour half-life temperatures of at least about 85° C. will be referred to as "high temperature initiators" and initiators having ten-hour half-life temperatures of less than about 85° C. will be referred to as "low temperature initiators".

The neat composition which is heated comprises at least one poly(allyl carbonate)-functional monomer. In most cases the neat composition comprises a mixture of poly(allyl carbonate)-functional monomers.

Poly(allyl carbonate)-functional monomers which can be utilized in the practice of the present invention are the liquid poly(allyl carbonates) of polyhydroxy organic materials. Examples of such monomers include poly(allyl carbonates) of linear or branched aliphatic polyols, poly(allyl carbonates) of cycloaliphatic-containing polyols, and poly(allyl carbonates) of aromatic-containing polyhydroxy compounds. The monomers are themselves known and can be prepared by procedures well known in the art. See, for example, U.S. Pat. Nos. 2,370,567; 2,403,113; 2,455,652;

2,455,653; 2,587,437; 4,144,262; and 4,742,133, the disclosures of which are, in their entireties, incorporated herein by reference. In one method, the appropriate allyl alcohol is reacted with phosgene to form the corresponding alkyl chloroformate which is then reacted with the desired polyhydroxy organic material. In another method the polyhydroxy organic material is reacted with phosgene to form organic polychloroformate which is then reacted with the appropriate allyl alcohol. In a third method, the polyhydroxy organic material, the appropriate allyl alcohol, and phosgene are mixed together and reacted. In all of these reactions the proportions of reactants are approximately stoichiometric, except that phosgene may be used in substantial excess if desired. The temperatures of the chloroformate-forming reactions are preferably below about 100° C. in order to minimize the formation of undesirable by-products. Ordinarily the chloroformate-forming reaction is in the range of from about 0° C. to about 20° C. The carbonate-forming reaction is usually conducted at about the same temperatures, although higher temperatures may be employed. Suitable acid acceptors, e.g., pyridine, a tertiary amine, an alkali metal hydroxide, or an alkaline earth metal hydroxide may be employed when desired.

Many poly(allyl carbonate)-functional monomers can be represented by Formula (1):

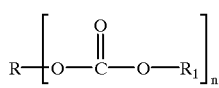

Formula (1)

wherein $R_1$ is the group derived from the unsaturated alcohol and is an allyl or substituted allyl group, $R_2$ is the organo group derived from the polyhydroxy organic material, and the average value of n is in the range of from about 2 to about 5, preferably about 2. For any particular compound the value of n is an integer. For mixtures of compounds, however, the average value of n may be a whole or a fractional number. The average value of n is based on the number average molecular weight of the poly(allyl carbonate)-functional monomer species constituting the mixture. The allyl group ($R_1$) can be substituted at the 2-position with a halogen, most notably chlorine or bromine, or an alkyl group containing from 1 to about 4 carbon atoms, generally a methyl or ethyl group. The $R_1$ group can be represented by Formula (2):

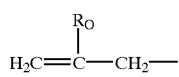

Formula (2)

wherein $R_0$ is hydrogen, halo, or an alkyl group containing from 1 to about 4 carbon atoms. Specific examples of $R_1$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly, $R_1$ is the allyl group, $H_2C=CH-CH_2-$.

$R_2$ is a polyvalent group derived from the polyhydroxy organic material, which can be an aliphatic polyol or a polyhydroxy-functional aromatic-containing compound that contains 2, 3, 4, or 5 hydroxy groups. Typically, the polyhydroxy organic material contains 2 hydroxy groups, as for example, a glycol or bisphenol. The aliphatic polyol can be linear or branched and contain from 2 to about 10 carbon atoms. Commonly, the aliphatic polyol is an alkylene glycol having from 2 to 4 carbon atoms or a poly($C_2$–$C_4$) alkylene glycol, as for example, ethylene glycol, propylene glycol, trimethylene glycol, tetramethylene glycol, or diethylene glycol, triethylene glycol, etc.

One class of polyhydroxy-functional aromatic-containing compounds can be represented by Formula (3):

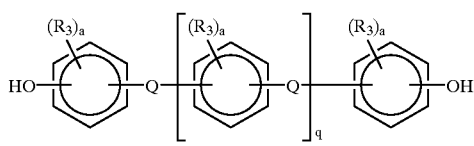

Formula (3)

in which each $R_3$ is independently alkyl containing from 1 to about 4 carbon atoms, phenyl, or halo; the value of each a is independently in the range of from 0 to 4; each Q is independently oxy, sulfonyl, alkanediyl having from 2 to about 4 carbon atoms, or alkylidene having from 1 to about 4 carbon atoms; and the value of q is in the range of from 0 to about 3. Preferably Q is 1-methylethylidene, viz., isopropylidene.

Preferably the value of q is zero, in which case a sub-class is represented by Formula (4):

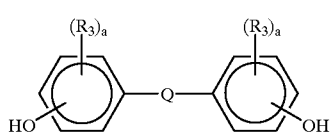

Formula (4)

in which each $R_3$, each a, and Q are as discussed in respect of Formula (3). Preferably the two hydroxyl groups are both in the ortho or para positions. The para positions are especially preferred.

The preferred polyhydroxy-functional aromatic-containing compound is represented by Formula (5):

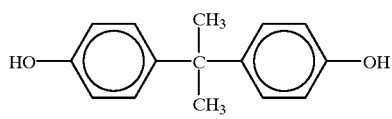

Formula (5)

The polyhydroxy organic material from which $R_2$ is derived may also be polyhydroxy-functional chain extended compounds. Examples of such compounds based on alkylene oxide extension include ethylene oxide extended trimethylolpropane, propylene oxide extended trimethylolpropane, ethylene oxide extended glycerol, and propylene oxide extended glycerol. Additional examples include ethylene oxide extended bisphenols such as those represented by Formula (6):

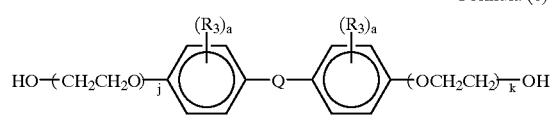

Formula (6)

where Q, $R_3$, and a are as discussed above in respect of Formula (3), and j and k are each independently 1, 2, 3, or 4. Many compounds based on lactone extension are described in U.S. Pat. No. 3,169,945, the entire disclosure of which is incorporated herein by reference.

Specific examples of the radical $R_2$ include: alkylene groups containing from 2 to 10 carbon atoms such as ethylene, (—$CH_2$—$CH_2$—), trimethylene, methylethylene, tetramethylene, ethylethylene, pentamethylene, hexamethylene, 2-methylhexamethylene, octamethylene, and decamethylene; alkylene ether groups such as —$CH_2OCH_2$—, —$CH_2CH_2OCH_2CH_2$—, —$CH_2OCH_2CH_2$—, and —$CH_2CH_2CH_2OCH_2CH_2CH_2$—; alkylene polyether groups such as —$CH_2CH_2OCH_2CH_2OCH_2CH_2$— and —$CH_2CH_2CH_2OCH_2CH_2CH_2OCH_2CH_2CH_2$—; alkylene carbonate and alkylene ether carbonate groups such as —$CH_2CH_2OC(O)OCH_2CH_2$— and —$CH_2CH_2OCH_2CH_2OC(O)OCH_2CH_2OCH_2CH_2$—; and 1-methylethylidenedi-4,1-phenylene. Most commonly, $R_2$ is —$CH_2CH_2$—, —$CH_2CH_2OCH_2CH_2$—, or —$CH_2CH_2OCH_2CH_2OCH_2CH_2$—.

Specific examples of poly(allyl carbonate)-functional monomers useful in the practice of the invention herein contemplated include ethylene glycol bis(2-chloroallyl carbonate), ethylene glycol bis(allyl carbonate), 1,4-butanediol bis(allyl carbonate), 1,5-pentanediol bis(allyl carbonate), 1,6-hexanediol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), isopropylidene bisphenol bis(allyl carbonate), oxy bisphenol bis(allyl carbonate), sulfonyl bisphenol bis(allyl carbonate), and the tris(allyl carbonate) of tris(2-hydroxyethyl)isocyanurate.

A preferred class of poly(allyl carbonate)-functional monomers is represented by Formula (7):

Formula (7)

wherein $R_0$ is hydrogen, halo or $C_1$–$C_4$ alkyl, and the average value of m is in the range of from about 1 to about 3. $R_0$ is preferably hydrogen. Diethylene glycol bis(allyl carbonate) is preferred. This monomer is commercially available from PPG Industries, Inc. and is sold as CR-39® Allyl Diglycol Carbonate.

Because of the process by which the poly(allyl carbonate)-functional monomer is prepared, the monomer compositions usually comprise a mixture of poly(allyl carbonate)-functional compounds each represented by either Formula (8):

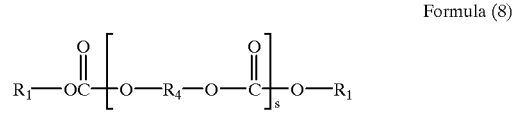

Formula (8)

or Formula (9):

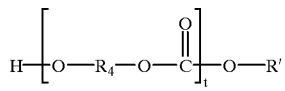

Formula (9)

wherein $R_1$ is as defined above with respect to Formula (1), each $R_4$ is independently a divalent group derived from a dihydroxy organic compound, R' is $R_1$ or hydroxyl, s is a positive integer, and t is a positive integer.

Analogous principles apply when the functionality of the polyhydroxy organic material is greater than two.

Diethylene glycol bis(allyl carbonate) monomer compositions usually comprise a mixture of diethylene glycol (allyl carbonate) compounds each represented by either Formula (10):

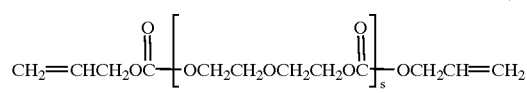

Formula (10)

or by Formula (11):

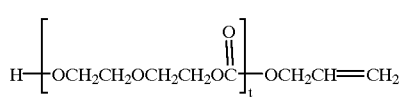

Formula (11)

wherein s is a positive integer and t is a positive integer. The diethylene glycol (allyl carbonate) compound for which the value of s is 1 usually constitutes from 25 to 99 area percent of the mixture of diethylene glycol (allyl carbonate) compounds. Often the diethylene glycol (allyl carbonate) compound for which the value of s is 1 constitutes from 25 to 95 area percent of the mixture of diethylene glycol (allyl carbonate) compounds. As used herein and in the claims, the relative amounts, expressed as area percent, of the diethylene glycol (allyl carbonate) compounds having differing values of s are determined by high performance liquid chromatography using an instrument equipped with a DuPont Zorbax Sil column operated at a temperature of approximately 15° C., a refractive index detector, and employing a mobile phase composition of 40% methylene chloride/25% ethyl ether/25% ethyl ether which was saturated with water/10% n-hexane, where the percentages are expressed as percent by volume.

A subclass of particular interest is a mixture of diethylene glycol (allyl carbonate) compounds each represented by Formula (10) or Formula (11) wherein the (allyl carbonate) compound for which the value of s is 1 constitutes from 82 to 95 area percent of the mixture of diethylene glycol (allyl carbonate) compounds.

Another subclass of particular interest is a mixture of diethylene glycol (allyl carbonate) compounds each represented by Formula (10) or Formula (11) wherein the (allyl carbonate) compound for which the value of s is 1 constitutes from 25 to 75 area percent of the mixture of diethylene glycol (allyl carbonate) compounds.

The mixture of diethylene glycol (allyl carbonate) compounds each represented by Formula (10) or Formula (11) is preferably prepared by reacting diethylene glycol bischloroformate with allyl alcohol and optionally diethylene glycol in the presence of a suitable acid acceptor, as for example, pyridine, a tertiary amine, or an alkaline or alkaline earth metal hydroxide. It is often convenient to use a 50% by weight solution of sodium hydroxide in water as the acid acceptor. A substantially inert, water insoluble organic diluent may optionally be used also. The combined amounts of allyl alcohol and diethylene glycol employed are at least sufficient to react with substantially all of the diethylene glycol bischloroformate. An increase in the ratio of the number of moles of diethylene glycol to the number of moles of diethylene glycol bischloroformate results in a decrease in the area percent of diethylene glycol (allyl carbonate) compound represented by Formula (10) in which s is 1, along with a corresponding increase in the area percent of compounds represented by Formula (10) in which s is greater than 1. The ratio of the number of moles of diethylene glycol to the number of moles of diethylene glycol bischloroformate is generally within the range of from 0 to 0.9:1. The base is added slowly to the reaction medium containing the diethylene glycol bischloroformate, allyl alcohol, and diethylene glycol, while external cooling is applied in order to control the reaction temperature, often within the range of from 0° C. to 25° C.

After substantially all of the chloroformate groups are reacted, removal of the aqueous phase is often preferred. If desired, the organic phase may be washed with water in order to remove inorganic by-products, and vacuum stripped to remove water, solvent, and other volatile materials.

The poly(allyl carbonate)-functional monomer composition may be purified so as to contain essentially no related monomer species, but this is rarely done. Although the poly(allyl carbonate)-functional monomer composition may contain only a single related monomer species, it usually contains a mixture of different related monomer species. Typically all of the related monomer species taken together constitute from about 1 to about 75 weight percent of the poly(allyl carbonate)-functional monomer composition. Often all of the related monomer species taken together constitute from about 5 to about 75 weight percent of the poly(allyl carbonate)-functional monomer composition. In many instances all of the related monomer species taken together constitute from about 5 to about 18 weight percent of the poly(allyl carbonate)-functional monomer composition. In other instances all of the related monomer species taken together constitute from about 25 to about 75 weight percent of the poly(allyl carbonate)-functional monomer composition.

As used in the present description and claims, the term poly(allyl carbonate)-functional monomer or similar names, e.g., diethylene glycol bis(allyl carbonate), are intended to mean and include the named monomer and all related monomer species which may be contained therein.

There are many materials which may optionally be present in the liquid poly(allyl carbonate)-functional monomer composition employed in the process of the invention. Among these are optional ethylenically unsaturated compounds. As used herein and in the claims, "optional ethylenically unsaturated compound" means an ethylenically unsaturated compound which is not a poly(allyl carbonate)-functional compound. The optional ethylenically unsaturated compound may be an optional polyethylenically unsaturated compound or it may be an optional monoethylenically unsaturated compound. When two or more optional ethylenically unsaturated compounds are present, they may be optional polyethylenically unsaturated compounds, optional monoethylenically unsaturated compounds, or a mixture of one or more optional polyethylenically unsaturated compounds and one or more optional monoethylenically unsaturated compounds.

Other optional compounds which may be present include compounds which are devoid of (allyl carbonate) groups but do contain a plurality of allyl groups. Examples include 2,4,6-tris(allyloxy)-1,3,5-triazine [CAS 101-37-1], triallyl-1,3,5-triazine-2,4,6(1H,3H,5H)-trione [CAS 1025-15-6], diallyl phthalate [CAS 131-17-9], triallyl trimellitate [CAS 2694-54-4], and triallyl trimesate [CAS 17832-16-5].

Polymerizable polyethylenically unsaturated compounds which do not contain allyl groups may optionally be present. These include the bis(acrylates) and bis(methacrylates) of diols, the tris(acrylates) and tris(methacrylates) of triols, and the tetrakis(acrylates) and tetrakis(methacrylates) of tetraols. Examples of suitable diols include HOCH$_2$CH$_2$OCH$_2$CH$_2$OH and the diols represented by Formula (12)

HO—A—OH Formula (12)

The divalent radical A may be aliphatic, aromatic, or comprise both aliphatic and aromatic portions. Examples include alkanediyl groups containing from 2 to 10 carbon atoms such as 1,2-ethanediyl, 1,3-propanediyl, 2,2-dimethyl-1,3-propanediyl, 1-methyl-1,2-ethanediyl, 1,4-butanediyl, 1-ethyl-1,2-ethanediyl, 1,5-pentanediyl, 1,6-hexanediyl, 2-ethyl-1,6-hexanediyl, 1,8-octanediyl, and 1,10-decanediyl. Further examples include alkylene ether groups such as —CH$_2$OCH$_2$—, —CH$_2$CH$_2$CH$_2$OCH$_2$CH$_2$CH$_2$— and —CH$_2$OCH$_2$CH$_2$—. Other examples include alkylene polyether groups such as —CH$_2$CH$_2$OCH$_2$CH$_2$OCH$_2$CH$_2$—, and —CH$_2$CH$_2$CH$_2$OCH$_2$CH$_2$CH$_2$OCH$_2$CH$_2$CH$_2$—. Yet other examples include alkylene carbonate groups such as —CH$_2$CH$_2$OC(O)OCH$_2$CH$_2$— and alkylene ether carbonate groups such as —CH$_2$CH$_2$OCH$_2$CH$_2$OC(O)OCH$_2$CH$_2$—. Examples of cycloaliphatic groups include 1,3-cyclopentanediyl, 1,3-cyclohexanediyl, 1,4-cyclohexanediyl, and 1,5-cyclooctanediyl. Examples of aromatic groups include 1,3-phenylene and 1,4-phenylene. Examples of groups containing both aliphatic and aromatic portions include 2-methyl-1,4-phenylene, 2,6-dimethyl-1,4-phenylene, methylene-di-4,1-phenylene, 1-methylethylidene-di-4,1-phenylene, 1-methylethylidenebis[2,6-dibromo-4,1-phenylene], 1-methylethylidenebis[2,6-dichloro-4,1-phenylene], 1-methylpropylidene-di-4,1-phenylene, 1-methylethylidenebis(2-methyl-4,1-phenylene], 1,2-ethanediyl-di-4,1-phenylene, methylene-di-2,1-phenylene, 1-methylethylidenebis[2-(1-methylethyl)-4,1-phenylene], 1,3-phenylenebis[1-methylethylidene-4,1-phenylene], 1,4-phenylenebis[1-methylethylidene-4,1-phenylene, sulfonyl-di-4,1-phenylene, cyclohexylidene-di-4,1-phenylene, 1-phenylethylidene-di-4,1-phenylene, ethylidene-di-4,1-phenylene, propylidene-di-4,1-phenylene, 1-ethylpropylidene-di-4,1-phenylene, 1,4-cyclohexanediyl-di-4,1-phenylene, 1,3-cyclohexanediyl-di-4,1-phenylene, 1,2-cyclohexanediyl-di-4,1-phenylene, and thio-di-4,1-phenylene.

Examples of suitable triols include 1,1,1-trimethylolpropane, 1,2,3-propanetriol, and tris(2-hydroxyethyl)isocyanurate. Examples of suitable tetraols include pentaerythritol and erythritol.

The half-life of a free radical initiator at any specified temperature is defined as the time in which the initiator loses half of its activity. It is determined through studies of the decomposition kinetics of the initiator. See, for example, the product bulletin *Peroxide Selection Based on Half-Life*, Atochem North America, Organic Peroxides Division, Buffalo, N.Y. (1989); and Orville L. Magelli and Chester S. Sheppard, *Organic Peroxides*, Volume I, Daniel Swern, ed., Wiley-Interscience, New York, pages 81–87 (1970). The ten-hour half-life temperature of an initiator is the temperature at which one-half of the initiator originally present will decompose in 10 hours. Thus, half-life temperature provides a useful and effective guide to the selection of initiators for specific formulations and processing conditions. For partial polymerization of a poly(allyl carbonate)-functional monomer composition, any of the conventional free radical initiators, especially peroxide initiators, with a suitable ten-hour half-life temperature can be used. Initiators suitable for use in the present invention have a ten-hour half-life temperature of at least 85° C. The ten-hour half-life temperature is ordinarily within the range of from 85° C. to 135° C. It is frequently within the range of 90° C. to 120° C. From 95° C. to 105° C. is preferred. There are many such initiators, but the preferred initiator is OO-tert-butyl O-(2-ethylhexyl) monoperoxycarbonate [CAS 34443-12-4], which has a ten-hour half-life temperature of 100° C. Other initiators which may be used include OO-tert-butyl O-isopropyl monoperoxycarbonate [CAS 2372-21-6] and OO-tert-amyl O-(2-ethylhexyl)monoperoxycarbonate which have a ten-hour half-life temperature of 99° C.

Mixtures of high temperature initiators having the same or different ten-hour half-life temperatures may be used when desired. If the ten-hour half-life temperatures are the same, the principles are the same as when using a single high temperature initiator. If the half-life temperatures are different, it is preferred to use a non-isothermal reaction temperature profile which increases continuously or in stepwise fashion. The highest temperature in the later stages of the reaction should be high enough to consume at least some of the initiator that has the highest ten-hour half-life temperature.

Mixtures of at least one high temperature initiator and at least one low temperature initiator may also be used. In this case it is preferred to use lower reaction temperatures during the early part of the reaction until the low temperature initiators are mostly consumed. The purpose for using high temperature initiator is to ensure that the product liquid prepolymer composition will be stable at ambient temperatures even if unconsumed high temperature initiator is present. It is therefore preferred to have little or no low temperature initiator present in the product liquid prepolymer composition which could result in product instability at ambient temperatures.

The amount of high-temperature initiator which is present in the neat composition may vary widely. Usually the amount of high-temperature initiator employed is from 10 to 2500 parts of initiator per million parts of monomer, by weight. Frequently the amount employed is from 25 to 1200 parts of initiator per million parts of monomer, by weight. From 25 to 600 parts per million by weight is preferred. From 25 to 200 parts per million by weight is especially preferred. As polymerization progresses, initiator concentration usually decreases. Incremental additions of initiator during polymerization are contemplated.

The monomer which comprises at least one poly(allyl carbonate)-functional monomer is partially polymerized by heating a neat composition initially comprising the monomer and a high-temperature initiator to a temperature in the range of from 80° C. to 150° C. In many cases the temperature is in the range of from 5 Celsius degrees below the ten-hour half-life temperature of the high temperature peroxide initiator to 30 Celsius degrees above the ten-hour half-life temperature. Preferably the temperature is in the range of from the ten-hour-life temperature of the initiator to 10 Celsius degrees above the ten-hour half-life temperature. The neat composition may optionally be sparged with a nonreactive gas in order to remove substantially all of the dissolved oxygen. The neat composition is often sparged with a nonreactive gas for at least the first 15 minutes of the time during which it is heated. Preferably, the neat composition is sparged with a nonreactive gas during the entire time that it is heated. The flow rate of the nonreactive gas is usually at least 0.01 reactor volume per minute. Ordinarily, the flow rate is within the range of from 0.01 to 5 reactor volumes per minute. Frequently it is within the range of from 0.03 to 2 reactor volumes per minute. From 0.05 to 1 reactor volume per minute is preferred. Examples of nonreactive gases that may be used to sparge the neat composition include helium, argon, nitrogen, or a mixture of two or more thereof. Most often the neat composition is sparged with commercially pure nitrogen. The neat composition may remain quiescent or it may be agitated while it is maintained at the temperature discussed above. The agitation of the neat composition provided by the rising bubbles of nitrogen or other nonreactive gas that is used for sparging is often sufficient, but it is preferred to employ additional agitation such as that provided by paddles, stirrers, mixers, pumps, or other similar devices. As the neat composition is heated and polymerization progresses, its 25° C. viscosity increases. The neat composition is heated to form a reaction mixture having a 25° C. viscosity in the range of from 25 to 10,000 cps and an ethylenic double bond utilization of at least 3 percent. The reaction mixture is then cooled over a period of less than 90 minutes to a temperature at least 20 Celsius degrees below the ten-hour half-life temperature of the initiator.

Often the reaction mixture has a 25° C. viscosity in the range of from 45 to 3000 cps when cooling to a temperature at least 20 Celsius degrees below the ten-hour half-life temperature of the initiator is begun. Frequently the reaction mixture has a 25° C. viscosity in the range of from 60 to 1000 cps when such cooling is begun. In many cases the reaction mixture has a 25° C. viscosity in the range of from 75 to 400 cps when the cooling is begun. In some instances the reaction mixture has a 25° C. viscosity in the range of from 80 to 120 cps when the cooling is begun. In other instances the reaction mixture has a 25° C. viscosity in the range of from 200 to 350 cps when such is begun.

As used herein, the 25° C. viscosity of a reaction mixture or a polymerizable, liquid, substantially gel-free composition is determined in accordance with ASTM Test Method D 2393-86.

Frequently the reaction mixture has an ethylenic double bond utilization in the range of from 3 to 16 percent when cooling to a temperature at least 20 Celsius degrees below the ten-hour half-life temperature of the initiator is begun. Often the reaction mixture has an ethylenic double bond utilization in the range of from 6 to 14 percent when such cooling is begun. Preferably the reaction mixture has an ethylenic double bond utilization in the range of from 8 to 12 percent when cooling to a temperature at least 20 Celsius degrees below the ten-hour half-life temperature of the initiator is begun.

As used herein and in the claims, the ethylenic double bond utilization of a reaction mixture or a polymerizable, liquid, substantially gel-free composition is the percentage of total available ethylenic double bonds of monomer which are consumed in forming the prepolymer. The ethylenic double bond utilization is determined by iodometric titration as follows. One gram of sample weighed to the nearest 0.0001 gram is added to a 250-milliliter Erlenmeyer flask, and 50 milliliters of chloroform is added to dissolve the sample. Twenty milliliters of a 0.5 molar solution of iodine monochloride in acetic acid is added. The flask is capped and stored in the dark for one hour. Fifty milliliters of a 1.8 molar aqueous solution of potassium iodide is then added and titration with a standard 0.5 normal sodium thiosulfate solution is begun with vigorous stirring. Titration is continued until the yellow color disappears. The titration should be carried out slowly when approaching the endpoint to avoid over-titration. A blank is also titrated in the same manner. Iodine value, whether of the partially polymerized monomer or of the initial monomer which has not been partially polymerized, is calculated as follows:

$$I=(T_b-T_s)(N)(12.692)/W$$

where:

I is the iodine value expressed as grams of $I_2$ per 100 grams of sample;

$T_b$ is the titer of the blank expressed as milliliters of the sodium thiosulfate solution;

$T_s$ is the titer of the sample expressed as milliliters of the sodium thiosulfate solution;

N is the normality of the sodium thiosulfate solution; and

W is the mass of the sample expressed in grams.

The ethylenic double bond utilization is calculated as follows:

$$U=100(I_i-I_p)/I$$

where:

U is the ethylenic double bond utilization expressed as percent;

$I_i$ is the iodine value of the initial monomer which has not been partially polymerized expressed as grams of I2 per 100 grams of sample; and $I_p$ is the iodine value of the partially polymerized monomer expressed as grams of $I_2$ per 100 grams of sample.

The cooling period to a temperature at least 20 Celsius degrees below the ten-hour half-life temperature of the initiator is frequently less than 1 hour. A cooling period to a temperature at least 20 Celsius degrees below the ten-hour half-life temperature of the initiator of about 30 minutes or less is preferred. The mixture is thereafter cooled to ambient temperature at any convenient rate. During the cool-down, the viscosity of the reaction mixture increases a small amount, the magnitude of which depends upon the reactivities of the initiator and ethylenically unsaturated compounds, the initial and final temperatures, and the cooling rate.

The prepolymer product is substantially storage-stable at ordinary ambient temperatures Often the polymerizable, liquid, substantially gel-free composition produced by the process of the invention has a 25° C. viscosity of 10,000 cps or lower. In many instances the 25° C. viscosity is 3000 cps or lower. Frequently the 25° C. viscosity is 1000 cps or lower. Preferably, the 25° C. viscosity is 400 cps or lower. More preferably the 25° C. viscosity is 125 cps or lower.

The polymerizable, liquid, substantially gel-free composition produced by the process of the invention has an ethylenic double bond utilization of at least 3 percent. Frequently the ethylenic double bond utilization is in the range of from 3 to 16 percent. From 6 to 14 percent is preferred. From 8 to 12 percent is especially preferred.

In most cases the polymerizable, liquid, substantially gel-free composition of the invention is conformed to the shape of the desired solid polymerized article before polymerization to form such article. For example, the polymerizable, liquid, substantially gel-free composition can be poured onto a flat surface and polymerized to form a flat sheet or coating. According to a still further exemplification, the polymerizable, liquid, substantially gel-free composition is placed in molds, as for instance glass molds, and polymerized to form shaped articles such as lens blanks or lenses. This procedure is particularly advantageous for the preparation of ophthalmic lens blanks and ophthalmic lenses.

The polymerizable, liquid, substantially gel-free composition of the invention may be polymerized to the thermoset state by known conventional techniques for polymerizing (allyl carbonate)-containing formulations.

In one embodiment, polymerization is accomplished by heating the polymerizable formulation containing free radical initiator to elevated temperatures. Usually the heating is accomplished in an oven or in a water bath. Typically polymerization is conducted at temperatures in the range of from about 28° C. to about 130° C. In many cases post curing, that is, heating beyond the time thought necessary to substantially fully polymerize the formulation is employed. The post cure is often carried out at temperatures at or above the maximum temperature of the cure cycle, but below those temperatures at which thermal degradation provides undesirable yellowness, and preferably for a time sufficient to attain either substantially constant or maximum Barcol hardness. In most instances the post cure is accomplished at temperatures in the range of from 100° C. to 130° C.

The initiators which may be used in the present invention to polymerize the polymerizable, liquid, substantially gel-free composition may be widely varied, but in general they are thermally decomposable to produce radical pairs. One or both members of the radical pair are available to initiate addition polymerization of ethylenically unsaturated groups in the well-known manner.

The preferred initiators are peroxy initiators. Many suitable peroxy initiators are disclosed in U.S. Pat. No. 4,959,429, which disclosure is incorporated herein by reference. Diisopropyl peroxydicarbonate [CAS 105-64-6], benzoyl peroxide [CAS 94-36-0], tertiary-butylperoxy isopropyl carbonate [CAS 2372-21-6], and tertiary-amylperoxy isopropyl carbonate [CAS 2372-22-7] are the preferred initiators.

When used, the amount of initiator present in the polymerizable, liquid, substantially gel-free composition of the invention may be widely varied. Ordinarily the weight ratio of the initiator to all ethylenically unsaturated material present in the polymerizable, liquid, substantially gel-free composition is in the range of from about 0.3:100 to about 7:100. In many cases the weight ratio is in the range of from about 0.5:100 to about 5:100. The initiator may be incorporated into polymerizable, liquid, substantially gel-free composition by admixing it with the other components.

It will be recognized by those skilled in the art that the most preferred weight ratios of initiator will depend upon the nature of the initiator used as well as the natures and ratios of the various ethylenically unsaturated materials present in the polymerizable, liquid, substantially gel-free composition of the invention.

A wide variety of cure cycles, that is, time-temperature sequences, may be used during polymerization of the polymerizable, liquid, substantially gel-free composition. Ordinarily the cure cycle employed is based upon a consideration of several factors including the size of the casting, the identity of the initiator, and the reactivity of the ethylenically unsaturated material. A preferred cure cycle for use with diisopropylperoxydicarbonate initiator is shown in Table 1. This cure cycle is only exemplary and others, including those disclosed in Tables 1–4 of U.S. Pat. No. 4,959,429, may be used. Tables 1–4 of U.S. Pat. No. 4,959,429 are incorporated herein by reference.

TABLE 1

| Cumulative Hours | Oven Temperature, ° C. |
|---|---|
| 0 | 44 |
| 10.1 | 58 |
| 12.0 | 64 |
| 14.5 | 70 |
| 15.2 | 77 |
| 16.2 | 85 |
| 16.5 | 90 |
| 17.0 | 104 |
| 17.25 | 104 |
| 19.75 | 80 (End of Cycle) |

Note: The temperature changes between adjacent points shown in the Table are linear.

If molds were employed, the polymerizates are removed from the molds.

The polymerizable, liquid, substantially gel-free composition may be polymerized to the thermoset state by exposure to ionizing radiation such as gamma radiation, X-rays, accelerated electrons, accelerated protons, accelerated alpha-particles, or high speed neutrons.

The invention is further described in conjunction with the following example which is to be considered illustrative rather than limiting, and in which all parts are parts by weight and all percentages are percentages by weight unless otherwise specified. The values of various physical properties were determined as follows:

The densities of polymerizable, liquid, substantially gel-free compositions were determined in accordance with ASTM Method D 4052-96;

The refractive indices of polymerizable, liquid, substantially gel-free compositions were determined in accordance with ASTM Method D 1218-92;

The yellowness indices of polymerizable, liquid, substantially gel-free compositions were determined in accordance with ASTM Method E 450-82 (reapproved 1987);

The densities of solid polymerizates were determined in accordance with ASTM Test Method D 792-91;

The luminous transmissions of solid polymerizates were determined on samples having a thickness of 3.2 millimeters in accordance with ASTM Test Method D 1003-95 using a HunterLab® Colorquest® II Sphere Colorimeter System (Hunter Associates Laboratory, Inc., Reston, Va., USA). As the luminous transmission approaches one hundred percent, the difference in luminous transmissions for two samples of the same material but of differing thicknesses approaches zero. Consequently, values of luminous transmission of 90 percent or greater ascertained from samples having thicknesses as low as about 2 millimeters or as high as about 4 millimeters approximate reasonably well the luminous transmission at the standard thickness;

The yellowness indices of solid polymerizates were determined on specimens having a thickness of 3.2 millimeters in accordance with ASTM Test Method D 1925-70 (Reapproved 1988) using a HunterLab® Colorquest® II Sphere Colorimeter System (Hunter Associates Laboratory, Inc., Reston, Va., USA). Although the yellowness index seems to vary more with sample thickness than luminous transmission, nevertheless yellowness indices ascertained from samples having thicknesses as low as about 2 millimeters or as high as about 4 millimeters do provide a useful general indication of the yellowness index at the standard thickness;

The heat distortion temperatures of solid polymerizates were determined for a deflection of 0.25 millimeters (10 mils) in accordance with ASTM D 648-95;

Barcol hardnesses of solid polymerizates were determined in accordance with ASTM Test Method D 2583-95 using a Barcol Impressor and taking scale readings 15 seconds after the impressor point has penetrated the specimen;

The refractive indices of solid polymerizates were determined in accordance with ASTM Test Method D 542-95; and The Abbe Numbers of solid polymerizates were determined in accordance with the usual definition:

$$A = (n_D - 1)/(n_F - n_C)$$

where:

$n_D$ is the refractive index using a wavelength of 589.3 nanometers (viz., the average of the yellow doublet of sodium), $n_F$ is the refractive index using a wavelength of 486.1 nanometers (viz., the blue line of hydrogen), and $n_C$ is the refractive index using a wavelength of 656.3 nanometers (viz., the red line of hydrogen).

EXAMPLE

Diethylene glycol bischloroformate (DECF) [CAS 106-75-2], allyl alcohol (AA) [CAS 107-18-6], and diethylene glycol (DEG) [CAS 111-46-6] were mixed together in the following molar ratio: 1.00 DECF/1.96 AA/0.21 DEG. To this mixture, 2.44 moles of NaOH (in the form of a 50% by weight solution in water) was slowly added, while maintaining a reaction temperature of 5° C. with external cooling. After substantially all of the chloroformate groups had reacted, the aqueous phase was removed and the resulting mixture of diethylene glycol (allyl carbonate) compounds was washed twice with water. It was then vacuum stripped at an absolute pressure of approximately 1.3 Pascals at a temperature of approximately 150° C. The results of high performance liquid chromatographic analysis of the mixture based on Formula (I) and Formula (II) are shown in Table 2:

TABLE 2

| Compound | | |
|---|---|---|
| n | m | Amount, area % |
| 1 | | 64.1 |
| 2 | | 5.0 |
| 3 | | 17.6 |
| 4 | | 3.0 |
| 5 | | 5.2 |
| 6 | | 1.0 |
| 7 | | 1.1 |
| | 1 | 0.5 |
| | 2 | 1.1 |
| | 3 | 0.7 |
| | Total[1] | 99.3 |

[1]Several other peaks of small areas for compounds of uncertain structures were also present.

A 114-liter, glass-lined, jacketed reactor equipped with an agitator, thermocouples, and sources of steam and city water connected to the jacket for heating and cooling, respectively, was charged with 81.65 kilograms (kg) of the above mixture of diethylene glycol (allyl carbonate) compounds characterized by Table 2, 4.90 kg of 2,4,6-tris(allyloxy)-1,3,5-triazine containing approximately 180 ppm 4-methoxyphenol, and 17.3 grams of OO-tert-butyl O-(2-ethylhexyl) peroxycarbonate. The charged materials were admixed to form a reaction mixture. The viscosity of the reaction mixture was between 30 and 31 cps at 25° C. and the density was 1.1628 g/cm$^3$ at 25° C. The reaction mixture was stirred and heated to 110° C. and maintained at 110° C. while sparging with nitrogen at a flow rate of 0.05 reactor volume/minute. Samples were withdrawn every 30 minutes in order to monitor the reaction mixture viscosity. After 3.5 hours at 110° C., the 25° C. viscosity of the reaction mixture reached about 90 cps. The frequency of sample removal was thereafter increased to once every 10 to 15 minutes. After 4 hours at 110° C., the 25° C. viscosity of the reaction mixture was 105 cps. The reaction mixture was then cooled to about 80° C. within 30 minutes by gradually increasing the amount of cold water in the steam-water mixture that was being supplied to the jacket inlet. The reaction mixture was then cooled to 50° C. over a 1 hour period. During the cool-down from 110° C., there was an additional viscosity increase of 12 cps, resulting in a viscosity of 117 cps measured at 25° C. for the product. The density of the product was 1.1780 g/cm$^3$ at 25° C. According to measurements carried out by iodometric titration, 9 percent of the double bonds were consumed during the reaction. The product was a polymerizable, liquid, substantially gel-free composition.

Portions of the above polymerizable, liquid, substantially gel-free composition were stored for various periods of time after which several properties were determined. The results are shown in Table 3:

TABLE 3

Storage Conditions

| Storage Period, months | 0 | 7 | 3 | 4 | 6 |
|---|---|---|---|---|---|
| Storage Temperature, ° C. | NA[1] | 22–26 | 40–43 | 40–43 | 40–43 |
| Properties | | | | | |
| Density at 25° C., g/cm$^3$ | 1.1780 | 1.1780 | 1.1781 | 1.1789 | 1.1798 |
| Viscosity, at 25° C., cps | 117 | 117 | 123 | 138 | 162 |
| Refractive Index, $n_D^{20}$ | 1.4627 | 1.4627 | ND[2] | ND | 1.4627 |
| Yellowness Index, (50 mm path length) | 1.7 | 1.7 | 1.9 | 1.7 | 2.1 |

[1]NA = Not Applicable
[2]ND = Not Determined

A portion of the above unaged polymerizable, liquid, substantially gel-free composition was initiated with 3.5 parts of diisopropylperoxydicarbonate per 100 parts of polymerizable, liquid, substantially gel-free composition, by weight (phr). The initiated composition was poured into a mold and polymerized into a sheet 3.175 millimeters thick using the cure cycle of Table 1. The thermoset polymer which resulted was allowed to cool to ambient temperature and then tested for various physical properties. A portion of the polymerizable, liquid, substantially gel-free composition which had been aged for 6 months at 40° C.–43° C. was initiated with 3.5 phr of diisopropylperoxydicarbonate. The initiated composition was poured into a mold and polymerized into a sheet 3.175 millimeters thick using the cure cycle of Table 1. The thermoset polymer which resulted was allowed to cool to ambient temperature and then tested for various physical properties. The results of testing are shown in Table 4:

TABLE 4

| | From Initial Prepolymer | From Aged Prepolymer |
|---|---|---|
| Shrinkage, % | 10.9 | ND[1] |
| Density at 25° C., g/cm$^3$ | 1.322 | 1.321 |
| Luminous Transmission, % | 93.9 | 93.7 |
| Yellowness Index | 0.8 | 0.9 |
| Heat Distortion Temperature, ° C. | 55 | 57 |
| Barcol Hardness | 23 | 28 |
| Refractive Index, $n_D^{20}$ | 1.5011 | 1.5013 |
| Abbe Number | 54 | 59 |

[1]ND = Not Determined

Although the present invention has been described with reference to specific details of certain embodiments thereof, it is not intended that such details should be regarded as limitations upon the scope of the invention except insofar as they are included in the accompanying claims.

I claim:
1. A process for forming a polymerizable, liquid, substantially gel-free, poly(allyl carbonate)-functional prepolymer composition comprising:
   (a) heating a neat composition comprising at least one poly(allyl carbonate)-functional monomer and free radical initiator having a ten-hour half-life temperature of at least 85° C. at temperatures in the range of from 5 Celsius degrees below the ten-hour half-life temperature of the free radical initiator to 150° C., to form a reaction mixture having an increased 25° C. viscosity in the range of from 25 to 10,000 centipoises and an ethylenic double bond utilization of at least 3 percent; and
   (b) over a period of less than 90 minutes cooling the reaction mixture to a temperature at least 20 Celsius degrees below the ten-hour half-life temperature of the initiator.
2. The process of claim 1 wherein the neat composition is heated at temperatures in the range of from 5 Celsius degrees below the ten-hour half-life temperature of the free radical initiator to 30 Celsius degrees above the ten-hour half-life temperature of the free radical initiator.
3. The process of claim 1 wherein the neat composition is heated at temperatures in the range of from the ten-hour half-life temperature of the free radical initiator to 10 Celsius degrees above the ten-hour half-life temperature of the free radical initiator.
4. The process of claim 1 wherein the neat composition mixture is sparged with a nonreactive gas for at least the first 15 minutes of the time during which it is heated.

5. The process of claim 1 wherein the neat composition is sparged with a nonreactive gas during the entire time that it is heated.

6. The process of claim 1 wherein the reaction mixture has a 25° C. viscosity in the range of from 45 to 3000 centipoises when cooling to a temperature at least 20 Celsius degrees below the ten-hour half-life temperature of the initiator is begun.

7. The process of claim 1 wherein the reaction mixture has a 25° C. viscosity in the range of from 80 to 120 centipoises when cooling to a temperature at least 20 Celsius degrees below the ten-hour half-life temperature of the initiator is begun.

8. The process of claim 1 wherein the reaction mixture has a 25° C. viscosity in the range of from 200 to 350 centipoises when cooling to a temperature at least 20 Celsius degrees below the ten-hour half-life temperature of the initiator is begun.

9. The process of claim 1 wherein the reaction mixture has an ethylenic double bond utilization in the range of from 3 to 16 percent when cooling to a temperature at least 20 Celsius degrees below the ten-hour half-life temperature of the initiator is begun.

10. The process of claim 1 wherein the reaction mixture has an ethylenic double bond utilization in the range of from 8 to 12 percent when cooling to a temperature at least 20 Celsius degrees below the ten-hour half-life temperature of the initiator is begun.

11. The process of claim 1 wherein the reaction mixture is cooled over a period of less than 1 hour to a temperature at least 20 Celsius degrees below the ten-hour half-life temperature of the initiator.

12. The process of claim 1 wherein the reaction mixture is cooled over a period of less than 30 minutes to a temperature at least 20 Celsius degrees below the ten-hour half-life temperature of the initiator.

13. The process of claim 1 wherein the neat composition comprises diethylene glycol bis(allyl carbonate) monomer comprising a mixture of diethylene glycol (allyl carbonate) compounds each represented by either the formula:

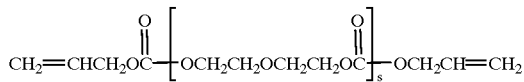

or by the formula:

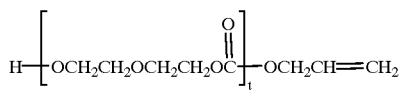

wherein s is a positive integer and t is a positive integer.

14. The process of claim 13 wherein the diethylene glycol (allyl carbonate) compound for which the value of s is 1 constitutes from 25 to 99 area percent of the mixture of diethylene glycol (allyl carbonate) compounds.

15. The process of claim 13 wherein the diethylene glycol (allyl carbonate) compound for which the value of s is 1 constitutes from 25 to 95 area percent of the mixture of diethylene glycol (allyl carbonate) compounds.

16. The process of claim 13 wherein the diethylene glycol (allyl carbonate) compound for which the value of s is 1 constitutes from 82 to 95 area percent of the mixture of diethylene glycol (allyl carbonate) compounds.

17. The process of claim 13 wherein the diethylene glycol (allyl carbonate) compound for which the value of s is 1 constitutes from 25 to 75 area percent of the mixture of diethylene glycol (allyl carbonate) compounds.

* * * * *

UNITED STATES PATENT AND TRADEMARK OFFICE
CERTIFICATE OF CORRECTION

PATENT NO. : 6,057,411
DATED : May 2, 2000
INVENTOR(S) : R. D. Herold

It is certified that error appears in the above-identified patent and that said Letters Patent is hereby corrected as shown below:

Column 3,
Line 28,

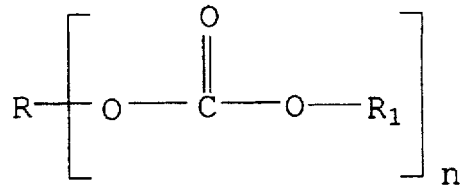

should be

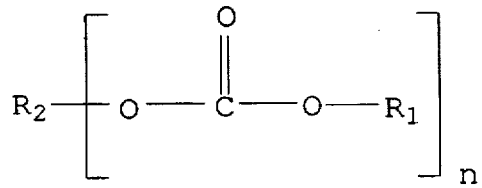

Signed and Sealed this

Fifth Day of February, 2002

Attest:

JAMES E. ROGAN
Attesting Officer  Director of the United States Patent and Trademark Office